(12) United States Patent
Surazski et al.

(10) Patent No.: US 8,732,314 B2
(45) Date of Patent: May 20, 2014

(54) GENERATION OF CONTACT INFORMATION BASED ON ASSOCIATING BROWSED CONTENT TO USER ACTIONS

(75) Inventors: Luke K. Surazski, San Jose, CA (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1529 days.

(21) Appl. No.: 11/506,867

(22) Filed: Aug. 21, 2006

(65) Prior Publication Data

US 2008/0046590 A1  Feb. 21, 2008

(51) Int. Cl.
*G06F 15/16* (2006.01)
*G06F 15/173* (2006.01)

(52) U.S. Cl.
USPC .......................................... 709/227; 709/238

(58) Field of Classification Search
USPC ................................................. 709/227, 238
See application file for complete search history.

(56) References Cited

U.S. PATENT DOCUMENTS

| | | | |
|---|---|---|---|
| 6,138,139 A * | 10/2000 | Beck et al. ..................... | 709/202 |
| 6,526,440 B1 | 2/2003 | Bharat | |
| 6,615,209 B1 | 9/2003 | Gomes et al. | |
| 6,658,423 B1 | 12/2003 | Pugh et al. | |
| 6,678,681 B1 | 1/2004 | Brin | |
| 6,725,259 B1 | 4/2004 | Bharat | |
| 6,934,634 B1 | 8/2005 | Ge | |
| 6,961,590 B1 | 11/2005 | Toebes | |
| 2002/0123988 A1 | 9/2002 | Dean et al. | |
| 2002/0152265 A1 * | 10/2002 | Felman .......................... | 709/203 |
| 2003/0107992 A1 | 6/2003 | Garcia-Luna-Aceves et al. | |
| 2003/0137974 A1 | 7/2003 | Kwan et al. | |
| 2004/0059708 A1 | 3/2004 | Dean et al. | |
| 2004/0119740 A1 | 6/2004 | Chang et al. | |
| 2004/0249951 A1 * | 12/2004 | Grabelsky et al. ............. | 709/227 |
| 2004/0261021 A1 | 12/2004 | Mittal et al. | |
| 2005/0149499 A1 | 7/2005 | Franz et al. | |
| 2005/0149851 A1 | 7/2005 | Mittal | |
| 2005/0209844 A1 | 9/2005 | Wu et al. | |
| 2005/0246588 A1 | 11/2005 | Deng et al. | |
| 2005/0289463 A1 | 12/2005 | Wu et al. | |
| 2007/0180147 A1 * | 8/2007 | Leigh ............................ | 709/246 |

OTHER PUBLICATIONS

U.S. Appl. No. 11/288,275, filed Nov. 29, 2005, Toebes.
Linksys WRT54G User Guide [online], 2002. [Retrieved on Oct. 7, 2013]. Retrieved from the Internet: <URL: http://www.netsmart.co.nz/manuals/wrt54_linksys.pdf>, 61 pages.

* cited by examiner

*Primary Examiner* — David Lazaro
*Assistant Examiner* — Mahran Abu Roumi
(74) *Attorney, Agent, or Firm* — Leon R. Turkevich

(57) ABSTRACT

A customer premises router identifies contacts based on web sites visited and searches conducted by a user device. The customer premises router also detects phone calls initiated by a user device (e.g., a Voice over IP telephony device), and identifies an association between a phone call to an identified called destination (e.g., a destination telephone number) and an identified contact, based on a prescribed association attribute. The identified associations are stored in nonvolatile memory. Any subsequent web request by a user device and related to the contact causes the customer premises router to supply to the user device the identified association specifying the contact and the identified called destination, enabling a user of the user device to determine the identified called destination for the contact, even if the visited web sites do not provide the identified called destination.

20 Claims, 5 Drawing Sheets

GENERATION OF CONTACT INFORMATION BASED ON ASSOCIATING BROWSED CONTENT TO USER ACTIONS

BACKGROUND OF THE INVENTION

1. Field of the Invention

The present invention relates to user-based software resources (e.g., contact management systems, web browsers) implemented on user devices within a customer premises, enabling a user to obtain contact information (e.g., phone number, e-mail address, website address, etc.) for a given contact (e.g., individual or business). The present invention also relates to residential access routers or gateway routers providing access for multiple users to a single service provider link.

2. Description of the Related Art

Businesses and organizations spend substantial resources on an annual basis in order to employ information systems that improve the availability and accessibility of information relevant to specific needs. Early information systems focused on database management schemes, where information was stored and classified using database management systems in order to obtain search results in response to specific database queries. Exemplary database management system vendors have included Oracle Corporation, IBM Informix®, Sybase®, Microsoft (e.g., Access and SQL Server) etc. Such database management systems, however, required some knowledge of the database query syntax, the organizational structure of the database, and knowledge of the available search keys for performing a database query. Hence, the earlier database management systems required some user expertise, rendering such systems less user friendly for less experienced users.

More recent search technologies have employed a web-based search model, where corporate directories can be searched using a web-based search model. For example, companies such as IBM, Google, and XI have created context search engines which consolidate and present data based on user queries.

Commonly-assigned, copending application Ser. No. 11/288,275, filed Nov. 29, 2005, entitled "Generating Search Results Based on Determined Relationships Between Data Objects and User Connections to Identified Destinations", the disclosure of which is incorporated in its entirety herein by reference, describes a search system that generates an ordered list of destination targets including identified individuals and data objects, based on applying a user context to an information context and to a connection context. The user context identifies a search context (i.e., the information the user is seeking) relative to an identity of the user, and the information context identifies destinations accessible by the user, including data objects and communications-based actions (e.g., Voice over IP telephony calls, instant messaging session transcripts, etc.). The connection context identifies relationships between chosen destinations throughout the system, and the strength of those relationships determined from artifacts of the chosen destinations. The portion of the connection context that is relevant to the user context is used to order the portion of the information context that is relevant to the user context, resulting in the ordered list of destination targets.

Hence, the above-incorporated application Ser. No. 11/288,275 enables large-scale business enterprises to deploy internal web-based search systems that enable business users to generate search results that include contact information (e.g., telephone numbers, e-mail addresses etc.) of individuals determined as relevant to the search context.

The aforementioned search technologies, however, are not practical for residential or small-office users because such users would not deploy an advanced search system in their customer premises (e.g., home, small office); rather, such residential or small-office users will typically use a single router that provides a connection for a limited number of users to a single local service provider link. The local service provider link is typically implemented in the form of a single Ethernet connection (e.g., Gigabit Ethernet) between the router and an access device (e.g., cable or DSL modem) that provides an interface to the access network of the local service provider.

Hence, residential or small-office users have needed to rely on manual searches and manual entry in order to generate contact information. For example, such residential/small-office users attempting to locate a telephone number for a business contact typically have needed to use the browser on their user computers to visit a corporate website responsible for the business contact, and navigate through the web pages generated by the corporate website to locate the relevant telephone number for the business contact. Depending on the web pages on the corporate website, however, the relevant telephone number may not be readily accessible, and in fact may not even be published on the corporate website.

Attempts to use web-based search tools for contact information (e.g., search engines offered on the World Wide Web at "google.com", "yahoo.com", "ask.com", etc.), requires the continued availability of information on the World Wide Web to enable the search engines to retrieve the information. Such web-based search services, however, may require unwanted advertisements to be displayed for a given search result, or royalties to be paid to the search service in exchange for providing the contact information. In addition, privacy concerns arise in the case of publishing contact information such as telephone numbers on the Internet; further, the web-based search tools are unable to provide telephone number for private (unpublished) telephone numbers.

User software applications known as contact managers have been used in order to enable an individual to maintain records of individuals and their respective attributes. Contact manager programs, such as Microsoft® Office Outlook® from Microsoft Corp. and Palm® desktop from Palm Source, Inc., enable an individual user to maintain contact records of persons deemed relevant by the user (i.e., contacts), each record enabling the user to input and store the corresponding information related to the contact such as telephone number, address, e-mail, and notes related to the contact. The contact managers also include search capabilities, enabling the user to identify a contact based on entering a search query. Such contact manager programs also may include a "click-to-dial" option, where a phone call to a contact in a contact manager entry having a stored telephone number can be initiated by the user "clicking" the appropriate icon in the entry. In all cases, however, the contact manager applications require manual input of data for the contacts, with limited group sharing based on the system.

A solution to these and other problems is described in the accompanying brief description of the attached drawings and the accompanying description of embodiment(s) of the invention as specified in the appended claims, the description of the embodiment(s) including at least one best mode for carrying out the invention.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

There is a need for an arrangement that enables telephone number information to be automatically associated with browsed content, without the necessity of relying on web search engines or telephone directories.

There also is a need for an arrangement that enables telephone number information to be automatically associated with browsed content based on user actions, enabling telephone number contact information to be generated for the browsed content, even if the telephone number contact information is not available in the browsed content.

These and other needs are attained by the disclosed embodiment, where a customer premises router is configured for identifying contacts based on web sites visited and searches conducted. The customer premises router also is configured for detecting phone calls initiated by a user device (e.g., a Voice over IP telephony device), and identifying an association between a phone call to an identified called destination (e.g., a destination telephone number) and an identified contact, based on a prescribed association attribute. The identified associations are stored in nonvolatile memory, and if the association is found to already exist in memory, the relevance of the association is increased. Hence, any subsequent request by a user device and related to the contact causes the customer premises router to supply to the user device the identified association specifying the contact and the identified called destination, enabling a user of the user device to determine the identified called destination for the contact, even if the visited web sites do not provide the identified called destination.

Hence, contact information that includes identified called destinations (e.g., destination telephone numbers) can automatically be generated at a customer premises site, eliminating the reliance of commercial web-based search services. Moreover, the generation of contact information based on user-initiated phone calls using a local user device at the customer premises provides a more customized association of identified called destinations to browsed content, ensuring that the identified association between browsed content and contact information more accurately reflects the intentions of the users at the customer premises site, as opposed to commercial web-based search tools where a given user has no control over the search results. In addition, the contact information remains local to the customer premises and is not published on the Internet, resolving concerns that private numbers not be publicly disclosed.

Figure 1:
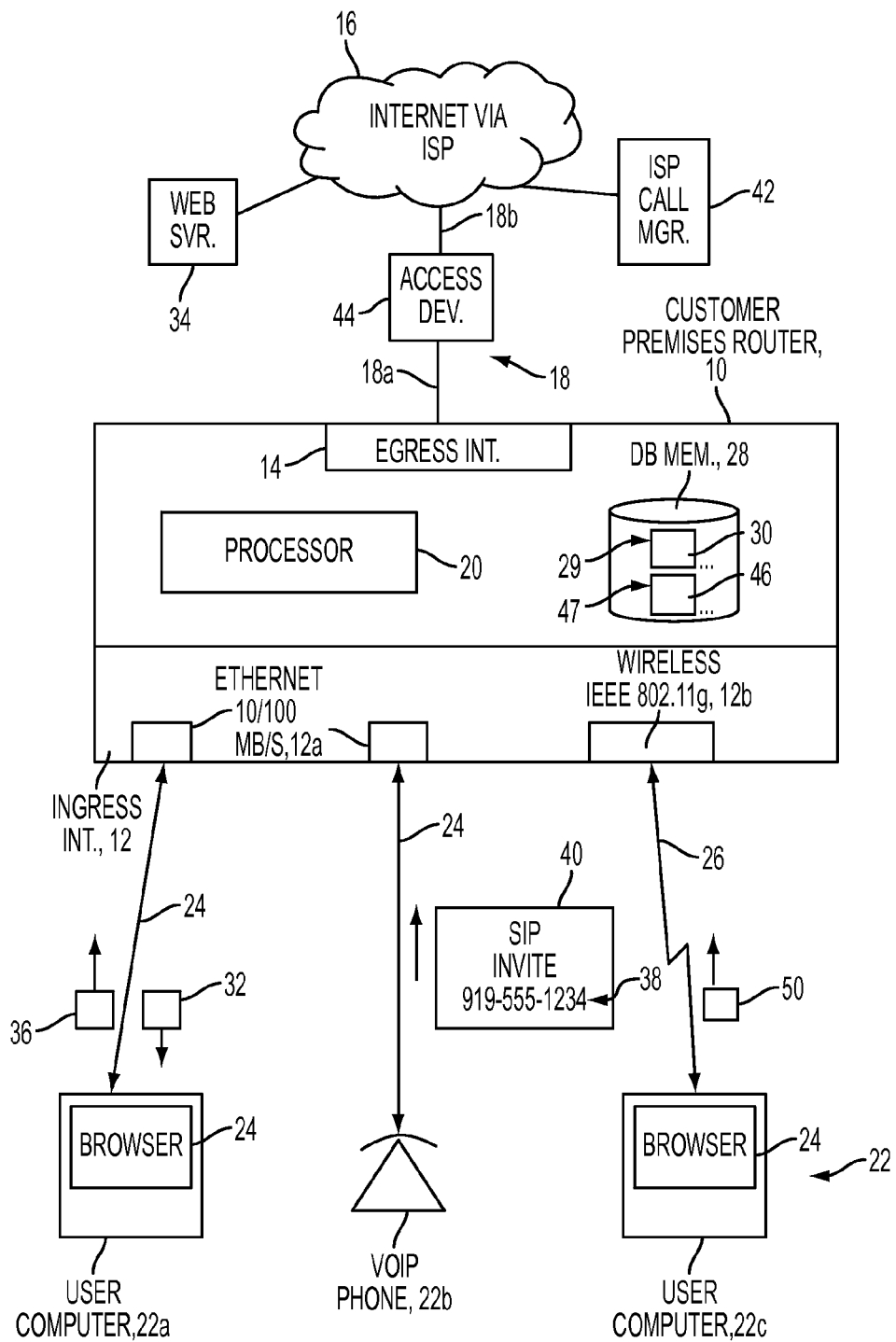
FIG. 1 is a diagram illustrating a customer premises router configured for providing access for user devices to a wide area network via a single service provider link, and providing contact information based on browsed content, according to an embodiment of the present invention.

FIG. 1 is a diagram illustrating a customer premises router 10 having multiple ingress interfaces 12, an egress interface port 14 configured for reaching a wide area network 16 via a single service provider link 18, and a processor 20. The ingress interfaces 12 are configured for providing access to the single service provider link 18 for multiple user devices 22: for example, the ingress interfaces 12a may be implemented as $10/100$ Mb per second Ethernet ports providing wired links 24 to a user computer 22a executing a browser 24, and a Voice over IP enabled telephone 22b. The customer premises router 10 also may include a wireless link interface 12b configured for establishing a wireless link 26 (e.g., IEEE 802.11g) with another user computer 22c having a wireless interface.

As described in further detail below, the processor 20 in the customer premises router 10 is configured for maintaining in memory 28 a list 29 of "contacts" 30 based on web sites visited and searches conducted. In particular, the processor 20 is configured for monitoring a web response 32 having been output by a web server 34 in response to a web request 36 from one of the user devices (e.g., 22a). The list 29 of contacts is based on the most recent uniform resource identifiers (URIs), and/or search terms specified in the web response 32. The results of the list 29 also may be deleted after a prescribed stale interval, for example 15-30 minutes, described in further detail below.

The processor 20 is configured for detecting any phone call having been initiated by the Voice over IP telephone 22b to an identified called destination 38, for example based on parsing a Voice over IP message 40 (e.g., a SIP Invite message) output by the Voice over IP telephone 22b for delivery to a call manager 42 via the access device 44.

As described in detail in the above-incorporated application Ser. No. 11/288,275, associations can be established based on monitoring user actions relative to prescribed association attributes. The customer premises router 10 passes all users requests (e.g., web requests 36, SIP Invite requests 40, etc.) to the wide area network 16 via the single service provider link 18, as well as between user devices 22 such as computers 22a and 22c, Voice over IP telephones 22b, and network-enabled devices such as network disk drives or printers (not shown). Therefore, the customer premises router 10 is able to monitor all user actions involving the user devices 22.

Hence, the processor 20 is configured for employing a most-recently-used type of association attribute to identify an association 46 between the last web response 32 supplied to a user device 22a, and the next telephone number 38 called by the user of the Voice over IP telephone 22b. The identified association 46 is stored in the memory 28 as an entry of an association database 47, illustrated in FIG. 2, where the entry 46 specifies an identifier 48 that identifies the contact, and the identified called destination 38. Consequently, if a subsequent request 50 from any other user device (e.g., 22c) is related to the contact as identified by the uniform resource identifier (URI) 48, the processor 20 supplies the identified association 46 to the requesting user device 22c (in step 106) for concurrent display of the requested web page 52 plus a pop-up display 54 that displays the contact URI 48 and the identified called destination 38. As described below, additional phone numbers 56 that are specified on different web pages owned by the contact 48 may be added to the list 29 of contacts 30, and may be ordered in the identified association 46 based on respective hit counter values 60.

Figure 3A:
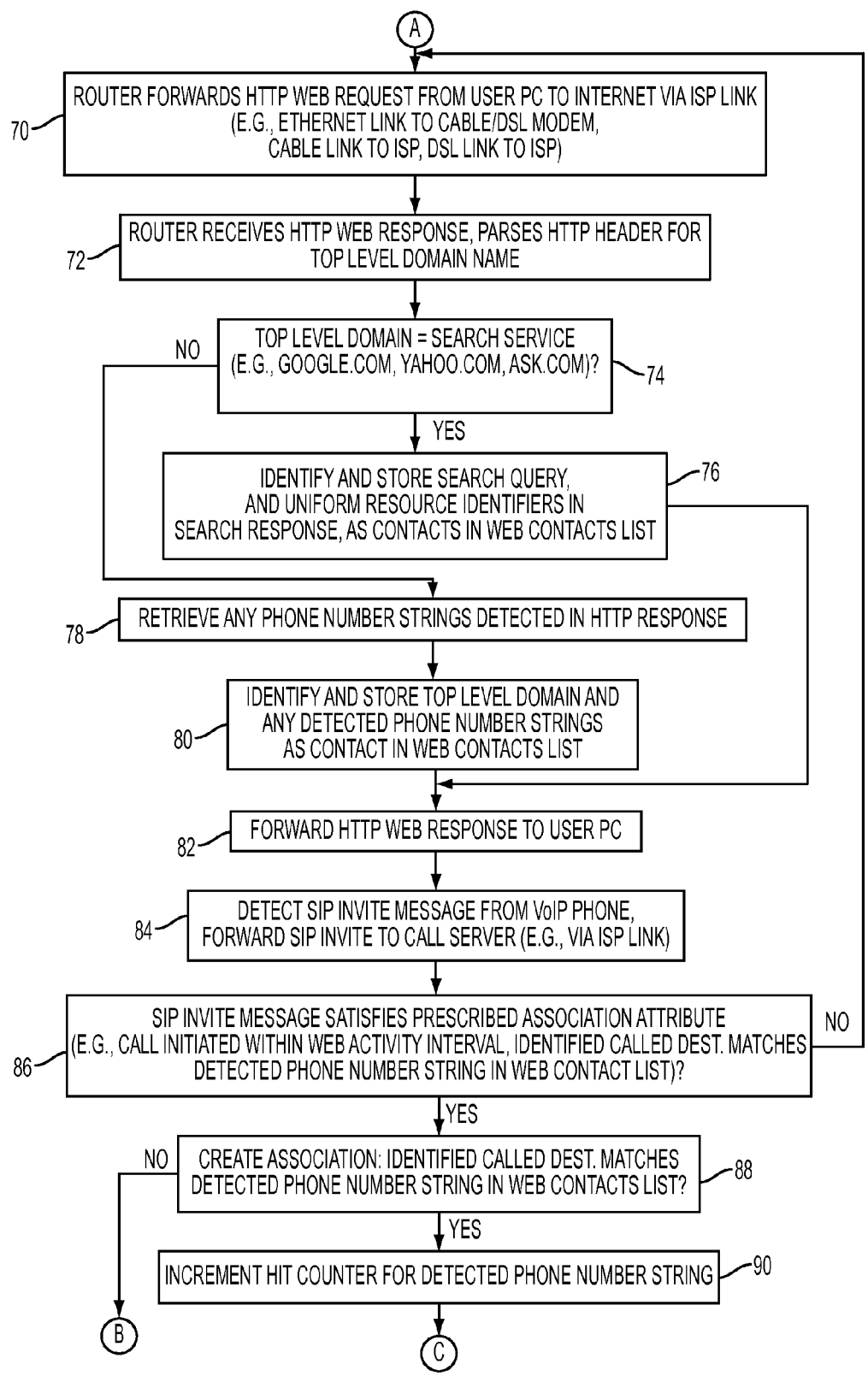
FIGS. 3A and 3B are diagrams illustrating the method by the customer premises router of FIG. 2 of identifying an association between a contact and an identified called destination, and supplying the identified association to a user device, according to an embodiment of the present invention.
Figure 3B:
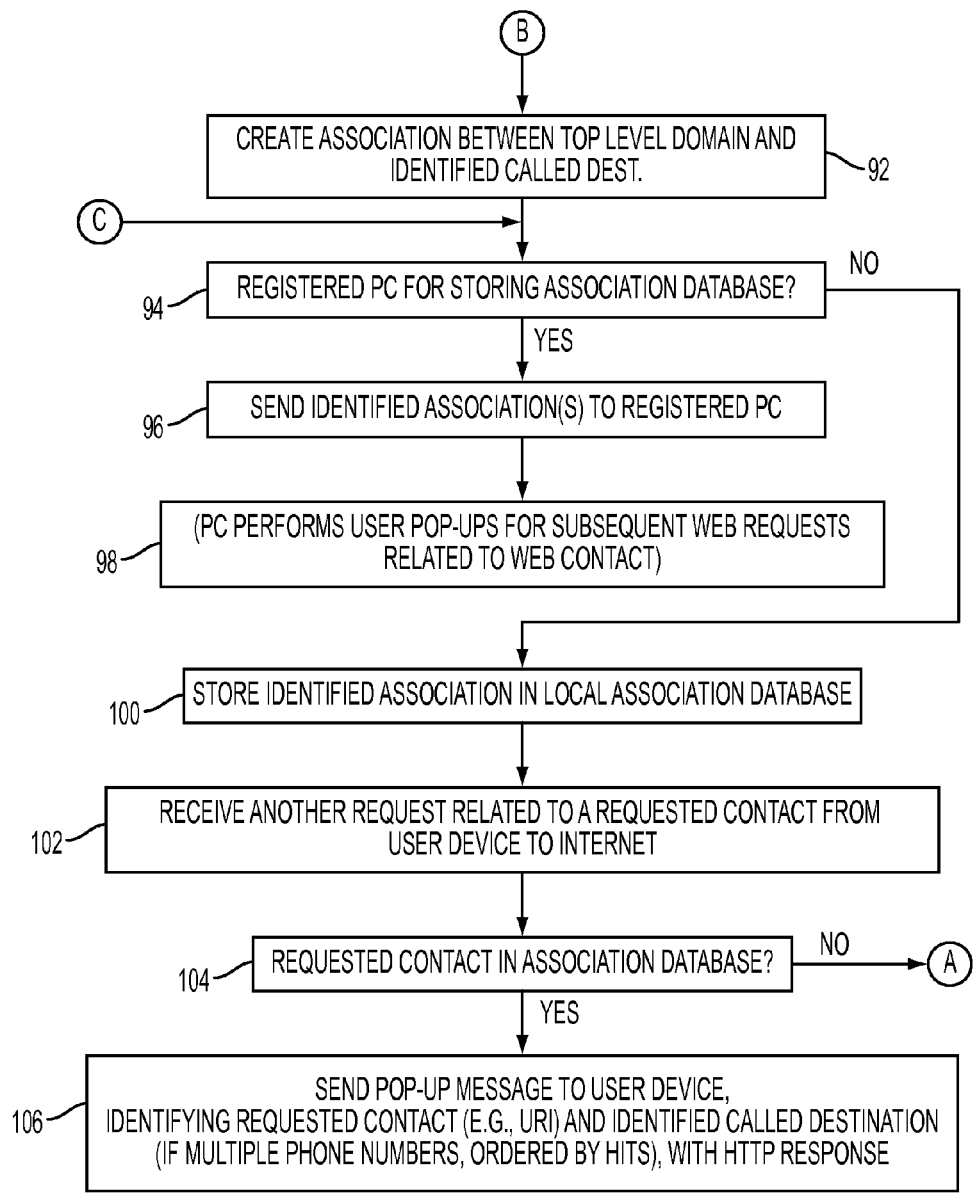
Figure 4:
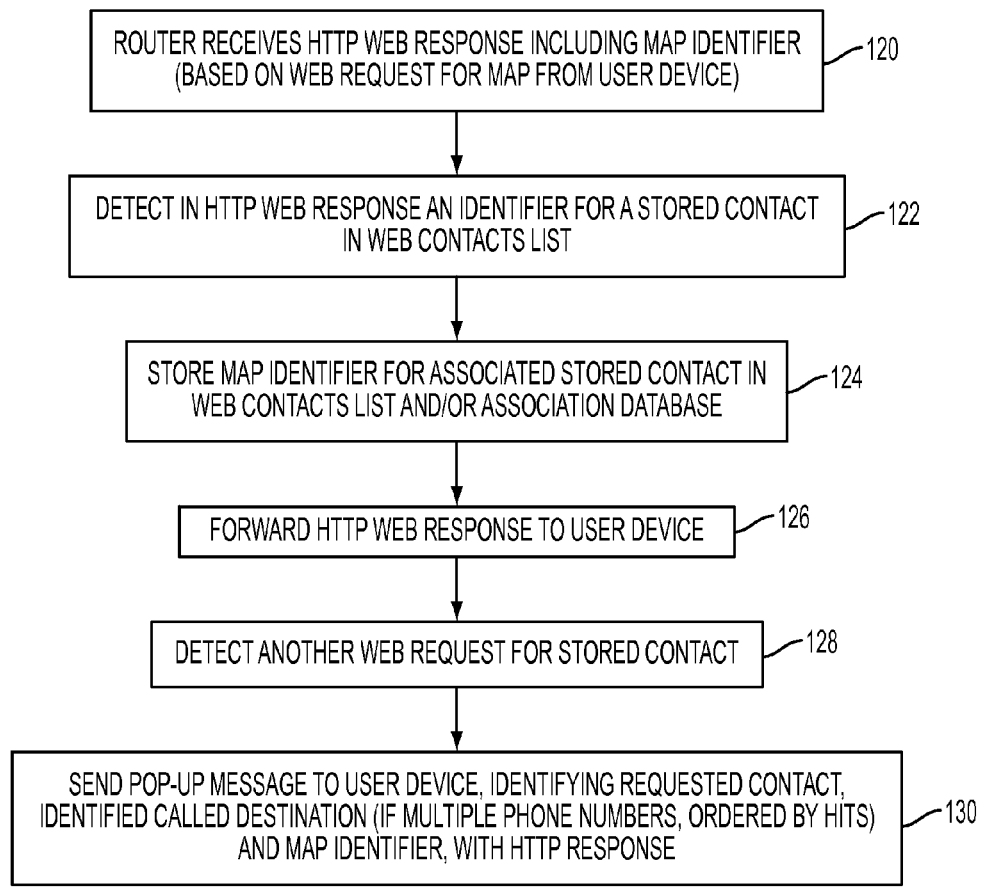
FIG. 4 is a diagram illustrating an optional enhancement for including a map identifier with the associated contact and identified called destination to a user device.

FIGS. 3A and 3B are diagrams illustrating a method by the customer premises router 10 of generating contact information based on associating contacts identified from browsed content to identified called destinations detected based on user actions, according to an embodiment of the present invention. FIG. 4 is a diagram illustrating an additional feature involving associating map identifiers to the contact information, according to an embodiment of the present invention. The steps described in FIGS. 3A, 3B and 4 can be implemented as executable code stored on a tangible computer readable medium (e.g., a hard disk drive, a floppy drive, a random access memory, a read only memory, an EPROM, a compact disk, etc.) for execution by a processor-based device, or propagated via a tangible computer readable transmission medium (e.g., a transmission wire, an optical fiber, etc.) or propagated via a wireless computer readable transmission medium utilizing an electromagnetic carrier wave, etc.

The method begins in step 70, where the ingress interface 12 receives an HTTP web request 36 from a user computer (e.g., 22a), for example an HTTP GET request, and the processor 20 outputs the HTTP web request 36 to the Internet 16 via the service provider link 18. As illustrated in FIG. 1, the service provider link 18 may be implemented as a first link 18a that is coupled to an access device 44, and a second link 18b that couples the access device 44 to the Internet service provider providing access to the Internet 16: actual implementation will depend on the egress interface 14 and the access device 44; for example, if the access device 44 is implemented as a DSL or cable modem at the customer premises and the link 18b is a DSL or cable link to the ISP, the egress interface 14 will be configured for outputting media independent (e.g., gigabit Ethernet) data on the link 18a (implemented in the form of a gigabit Ethernet link); in contrast, if the egress interface 14 includes an integrated DSL or cable modem such that the DSL or cable modem is integrated within the customer premises router, then the service provider link 18a would be implemented as the DSL or cable link from the customer premises to the access device 44, implemented in this case as an access or headend router at the service provider facilities, and the link 18b is part of the ISP infrastructure.

As recognized in the art, the wide area network 16 forwards the web request 36 to the appropriate web server 34 in accordance with existing HTTP and Internet routing protocols: the web server 34 responds to the web request 36 by sending the HTTP web response 32 to the customer premises router 10 via the access device 44 and the service provider link 18.

The egress interface 14 receives in step 72 the HTTP web response 32, and the processor 20 parses the HTTP header of the web response 32 to identify the top-level domain name of the HTTP web response 32. If in step 74 the processor 20 determines that the top-level domain identifies a prescribed search service, the processor 20 identifies and stores in step 76 the search query as identified in the web response 32, and any URIs 48 in the web response 32 as potential contacts for storage in the web contacts list 29. Hence, the processor 20 in step 76 stores search results that are related to a given search query. Hence, even though the search results in the search query do not necessarily identify a single contact, the search query, the search results, and associated identified called destination 38 still may be helpful to a user in the form of a pop-up message 54 to assist a user in reaching a desired contact based on the search query.

If in step 74 the top-level domain does not specify a search service, indicating that the top-level domain identifier 48 corresponds to an actual contact (e.g., "joesgarage.com"), the processor 20 retrieves in step 78 any phone number strings 56 that may be detected in the HTTP response, and stores in step 80 the entry 30 specifying the top-level domain 48, and any detected phone number strings 56 as a contact in the web contacts list 29. The web response 32 is then forwarded to the user personal computer (PC) 22a in step 82.

Hence, any published telephone numbers 56 within the web page are included as part of the contact information for the corresponding contact identifier 48. In addition, since only the top-level domain is stored, multiple telephone numbers 56 may be added to the same identifier 48 based on retrieving the phone number strings from multiple web pages generated from the same web server 34 having the same top-level domain identifier 48. Consequently, the web contacts list 29 includes as many available numbers 56 as detected for a given contact as identified by the top-level domain identifier 48. As described previously, the entries in the web contacts list 29 may be deleted after a prescribed stale time interval, for example 15 to 30 minutes, corresponding to a maximum amount of time to be allowed between a user examining a web page and the user making a call based on examining the web page. In particular, the stale time interval is to ensure that a prescribed "associative proximity" is maintained by preventing stale web pages from being improperly associated with the user actions.

Figure 2:
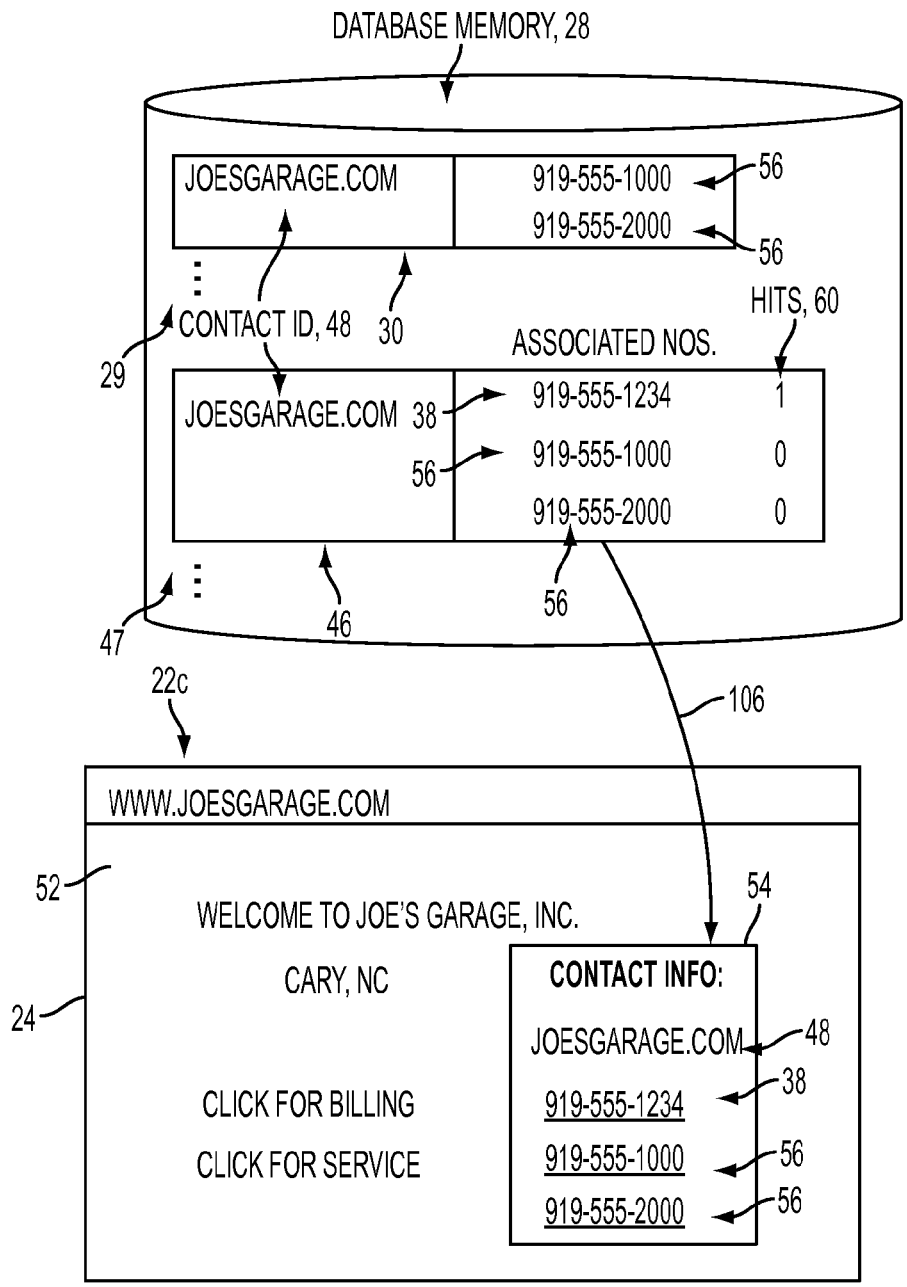
FIG. 2 is a diagram illustrating storage of an identified association between an identified contact and an identified called destination, and supply of the identified association to a user device, according to an embodiment of the present invention.

Assume in step 84 that the processor 20 detects another user device, namely the Voice over IP telephone 22b, sending a SIP invite message 40 as an attempt to initiate a phone call to an identified called destination 38 via the ISP call manager 42. If in step 86 the processor 20 determines that the SIP invite message 40 satisfies a prescribed association attribute (e.g., initiated within a web activity interval such as a 15 to 30 minutes, or matches one of the detected phone number strings 56), the processor 20 identifies and creates in step 88 an association 46 between the contact identified by its corresponding identifier 48, and the identified called destination. In particular, if in step 88 the identified called destination matches one of the detected phone numbers 56 in the web contacts list 29, the processor 20 increments in step 90 the corresponding hit counter 60 for the detected phone number string 56. Referring to FIG. 3B, if the identified called destination does not match any of the detected phone numbers 56 in the web contacts list 29, the processor 20 creates in step 92 a new association between the top-level domain identifier 48 and the identified called destination 38, as illustrated in FIGS. 1 and 2.

Hence, the processor 20 is able to establish the association 46 between a contact 48 based on browsed content, and the user action of initiating a phone call based on detecting the SIP invite message 40. It will be appreciated, however, that alternative means for detecting a dial-up number may be implemented, for example a device registered with the router 10 and that forwards dialed digits to the router 10 in the case of a telephony device that does not pass Voice over IP call control messages via the router 10.

Hence, the association 46 may be stored in the database memory 28 indefinitely, enabling an accumulation of contact information for various destinations. Since only the host name portion of the web page is being stored, the memory requirements for storing the associations 46 is relatively minimal, on the order of 50 to 70 bytes per entry, enabling 15 to 20 entries to be stored within 1024 bytes (1 kilobyte) of memory. Larger sized databases may be utilized by forwarding the identified associations 46 to a user computer. Hence, if in step 94 the processor 20 determines that the user device 22a has sent a request related to a contact, in other words has registered to receive association data for storage in its own association database (e.g., in the form of the request related any detected contact), the processor sends in step 96 the identified association 46 to the user device 22a in response to the registration request (i.e., related to any contact), enabling the user computer 22a to perform in step 98 the local contact pop-up information as described below with respect to steps 100 through 106 and steps 124 through 130 of FIG. 4.

Assuming there is at least one user device that is not registered for storing its own association database 47, the processor 20 stores in step 100 the identified association 46 in its database memory 28 in order to provide enhanced contact information for a user device (e.g., 22c).

Assume in step 102 that the egress interface 12 receives another request 50 related to the contact as identified by the corresponding identifier 48. In response to the processor 20 detecting in step 104 that the requested contact is identified in the association database 47, the processor 20 generates and outputs to the user device 22c in step 106 a pop-up message 54 that identifies the requested contact by its identifier 48, the identified call destination 38, and any other listed phone numbers 56, ordered by the number of hits, as illustrated in FIG. 2. For example, the pop-up message 54 may be implemented using a browser plug-in that either displays the pop-up message 54, or displays an active icon for performing a "click to dial". Alternatively, the pop-up message 54 may display the telephone numbers 38 and 56 as active hyperlinks that automatically initiate dialing in response to the user clicking the links.

As apparent from the foregoing, user actions from separate devices are associated in order to automatically associate contact information, eliminating the necessity of manual entry of phone numbers into a contact database. In addition, the relevance of an association can be increased based on increased frequency of use, as illustrated by the hit counter 60. In addition, once the initial association 46 has been established by the customer premises router 10, various implementations may be provided for communicating the association 46 to the user devices 22, for example dynamically updating a contact manager list in response to a client request implemented in the form of a registration with the customer premises router 10.

FIG. 4 is a diagram illustrating a further refinement, where the processor 20 also is configured for dynamically adding map identifiers for a given contact, for example if a user accesses a web page 32 for a restaurant, calls the restaurant (using the SIP Invite 40) to make a reservation, and then retrieves a map for the restaurant. In this case, the processor 20 detects in step 120 the HTTP web response including the map identifier based on the initial web request for a map from the user device 22. The processor 20 detects in step 122 an identifier for the stored contact in the web contacts list 29, for example based on the HTTP web response specifying the name of the stored contact. The processor 20 in response stores the map identifier for the associated stored contact in the web contacts list 29 and/or the association database 47 in step 124, and forwards the HTTP web response to the user device in step 126. In response to a subsequent web request for the stored contact in step 128, the processor 20 sends in step 130 a pop-up message to the user device that identifies not only the requested contact 48 and the identified called destination 38, but also the map identifier along with the HTTP response in order to enable the web browser 24 to concurrently display the web page 52 of the contact, as well as the pop-up display 54 displaying the contact information generated by the customer premises router 10.

According to the disclosed embodiment, contact information can be automatically obtained in a more efficient manner based on a local customer premises router associating browsed content by the user with telephony actions by the user. Hence, the associations are performed based on user actions, eliminating the reliance of search results by web-based search websites.

Numerous modifications and variations may be implemented, as desired. For example, the processor 20 may implement the association database 47 by grouping the associations entries 46 for use among multiple users (having distinct user identifiers) or devices (having distinct device identifiers); alternately the processor 20 may implement the association database 47 by building separate association databases for distinct entities (e.g., grouping the association entries 46 with based on distinct entity), each entity identifiable based on device association (e.g., device identifier or originating Voice over IP device information), device registration information (e.g., corresponding to a user identifier), etc.

In addition, even though the foregoing description specified storing only the top-level domain in the contact entry 30 or the association entry 46 to reduce memory requirements, the availability of additional memory permits the processor 20 to implement the association database 47 by building compressed search trees that split nodes as more contact information is found.

Further, the stored contact information be used for incoming calls; in this case, an incoming call from a matching number in the association entry 46 (e.g., the previously-called number 38 or a detected number string 56) causes the processor 20 in the router 10 to output a pop-up message 54 identifying the corresponding contact on the user computer 22a concurrent with the incoming call reaching (ringing) the VoIP phone 22b.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a customer premises router in a customer premises, the method including:
    establishing by the customer premises router an identified association between a contact and a destination telephone number, including the customer premises router storing the association in an association database;
    monitoring, by the customer premises router in the customer premises, user actions via respective distinct user devices connected to the customer premises router by respective wired or wireless links and that enable the customer premises router to establish the identified association between the contact and the destination telephone number, including:
    receiving a web response by the customer premises router from a wide area network via a single service provider link supplied to the customer premises router, the web response based on a first web request having been output from a first of the user devices to the wide area network via the customer premises router, the web response including an identifier identifying the contact,
    storing by the customer premises router the identifier, and
    detecting by the customer premises router a phone call to the destination telephone number having been initiated by a second of the user devices within the customer premises and distinct from the first user device;
    wherein the identified association is established based on the customer premises router detecting the phone call to the destination telephone number satisfies a prescribed association attribute, relative to the contact, of detecting initiation of the phone call within a prescribed time interval of receiving the web response identifying the contact; and the customer premises router supplying the identified association to any one of the user devices within the customer premises in response to a second request related to the contact and having been generated by said any one of the user devices.

2. The method of claim 1, wherein the contact in the web response identifies one of an originator of the web response or a web contact having a corresponding identified link in the web response.

3. The method of claim 1, wherein:
the receiving includes receiving the web response as a hypertext transport protocol (HTTP) response having an HTTP header;
the storing includes determining the identifier for the contact based on parsing the HTTP header in the HTTP response.

4. The method of claim 3, wherein:
the storing further includes detecting phone numbers in the HTTP response, and storing the detected phone numbers with the identifier;
the establishing including selectively creating an initial association with the contact and the destination telephone number based on a determined absence of the destination telephone number in the detected phone numbers, and selectively incrementing a hit counter for a corresponding one of the detected phone numbers in response to the destination telephone number corresponding to the one detected phone number.

5. The method of claim 4, wherein the supplying includes supplying the detected phone numbers to said any one of the user devices in an order based on the respective hit counters.

6. The method of claim 1, wherein the supplying includes supplying the identified association concurrent with a second web response corresponding to the second request, for concurrent display of the second web response and the identified call destination by said any one of the user devices.

7. The method of claim 1, further comprising:
receiving by the customer premises router, from the wide area network via the single service provider link, a second web response to a third web request having been output from a second any one of the user devices, the second web response including a map identifier for a map associated with the contact;
storing by the customer premises router the map identifier in association with the contact;
detecting by the customer premises router a fourth web request related to the contact from a third any one of the user devices;
supplying the identified association for the contact, including the identifier, the destination telephone number, and the map identifier, to the third any one of the user devices in response to the fourth web request.

8. The method of claim 1, further comprising storing the identified association in a database configured for storing a plurality of said identified associations between a plurality of said contacts, having been identified from respective web responses, and a respective plurality of destination telephone numbers from respective detected phone calls.

9. A customer premises router comprising:
a processor configured for establishing an identified association between a contact and a destination telephone number, including storing the association in an association database, the processor further configured for monitoring user actions via respective distinct user devices that enable the processor to establish the identified association between the contact and the destination telephone number;
an ingress interface configured for providing access to a single service provider link for the user devices within a customer premises based on the ingress interface providing data links for the user devices; and
an egress interface configured for reaching a wide area network via the single service provider link supplied to the customer premises, the egress interface further configured for receiving, from the wide area network via the single service provider link, a web response to a first web request having been output from a first of the user devices to the wide area network via the customer premises router, the web response including an identifier identifying the contact;
the processor further configured for:
(1) storing the identifier,
(2) detecting a phone call to the destination telephone number having been initiated by a second of the user devices within the customer premises and distinct from the first user device,
(3) establishing the identified association based on detecting the phone call to the destination satisfies a prescribed association attribute, relative to the contact, of detecting initiation of the phone call within a prescribed time interval of receiving the web response identifying the contact, and
(4) supplying the identified association to any one of the user devices within the customer premises in response to a second request related to the contact and having been generated by said any one of the user devices.

10. The router of claim 9, wherein:
the egress interface is configured for receiving the web response as a hypertext transport protocol (HTTP) response having an HTTP header;
the processor is configured for determining the identifier for the contact based on parsing the HTTP header in the HTTP response.

11. The router of claim 10, wherein the processor is further configured for:
detecting phone numbers in the HTTP response, and storing the detected phone numbers with the identifier;
establishing the identified association based on selectively creating an initial association with the contact and the destination telephone number based on a determined absence of the destination telephone number in the detected phone numbers, and selectively incrementing a hit counter for a corresponding one of the detected phone numbers in response to the destination telephone number corresponding to the one detected phone number.

12. The router of claim 11, wherein the processor is configured for supplying the detected phone numbers to said any one of the user devices in an order based on the respective hit counters.

13. The router of claim 9, wherein the processor is configured for supplying the identified association concurrent with a second web response corresponding to the second request, for concurrent display of the second web response and the identified call destination by said any one of the user devices.

14. The router of claim 9, wherein:
the egress interface is configured for receiving a second web response to a third web request having been output from a second any one of the user devices, the second web response including a map identifier for a map associated with the contact;

the processor further is configured for:
(1) storing the map identifier in association with the contact,
(2) detecting a fourth web request related to the contact from a third any one of the user devices, and
(3) supplying the identified association for the contact, including the identifier, the destination telephone number, and the map identifier, to the third any one of the user devices in response to the fourth web request.

15. The router of claim 9, further comprising a memory configured for storing a database of a plurality of said identified associations between a plurality of said contacts, having been identified from respective web responses, and a respective plurality of destination telephone numbers from respective detected phone calls.

16. A customer premises router comprising:
means for establishing an identified association between a contact and a destination telephone number, including storing the association in an association database, the processor further configured for monitoring user actions via respective distinct user devices that enable the processor to establish the identified association between the contact and the destination telephone number;
first interface means for providing access to a single service provider link for the user devices within a customer premises based on the first interface means providing data links for the user devices; and
second interface means for reaching a wide area network via the single service provider link supplied to the customer premises, the second interface means further configured for receiving, from the wide area network via the single service provider link, a web response to a first web request having been output from a first of the user devices to the wide area network via the customer premises router, the web response including an identifier identifying the contact;
the means for forwarding establishing further configured for:
(1) storing the identifier,
(2) detecting a phone call to the destination telephone number having been initiated by a second of the user devices within the customer premises and distinct from the first user device,
(3) establishing the identified association detected based on detecting the phone call to the destination satisfies a prescribed association attribute, relative to the contact, of detecting initiation of the phone call within a prescribed time interval of receiving the web response identifying the contact, and
(4) supplying the identified association to any one of the user devices within the customer premises in response to a second request related to the contact and having been generated by said any one of the user devices.

17. The router of claim 9, wherein the detecting includes parsing a Voice over IP message specifying the destination telephone number.

18. The router of claim 9, wherein the contact in the web response identifies one of an originator of the web response or a web contact having a corresponding identified link in the web response.

19. The method of claim 1, wherein the detecting includes parsing a Voice over IP message specifying the destination telephone number.

20. The router of claim 16, wherein the detecting includes parsing a Voice over IP message specifying the destination telephone number.

* * * * *